United States Patent [19]
Murahashi

[11] Patent Number: 5,864,652
[45] Date of Patent: *Jan. 26, 1999

[54] IMAGE STORAGE AND RETRIEVAL FOR A PRINTER

[75] Inventor: Seishin Murahashi, Newbury Park, Calif.

[73] Assignee: Dataproducts Corporation, Del.

[*] Notice: This patent issued on a continued prosecution application filed under 37 CFR 1.53(d), and is subject to the twenty year patent term provisions of 35 U.S.C. 154(a)(2).

[21] Appl. No.: 396,019

[22] Filed: Feb. 28, 1995

Related U.S. Application Data

[63] Continuation-in-part of Ser. No. 72,813, Jun. 7, 1993, abandoned, which is a continuation-in-part of Ser. No. 61,923, May 14, 1993, abandoned.

[51] Int. Cl.$^6$ .................................................. G06K 15/00
[52] U.S. Cl. .......................................... 395/115; 358/444
[58] Field of Search .................................... 358/444, 468, 358/400, 404, 261.4; 395/115, 116, 114, 101, 113, 827, 840, 841, 842, 872

[56] References Cited

U.S. PATENT DOCUMENTS

| | | |
|---|---|---|
| 4,591,997 | 5/1986 | Grabel . |
| 4,597,018 | 6/1986 | Sonobe et al. . |
| 4,722,064 | 1/1988 | Suzuki . |
| 4,884,147 | 11/1989 | Arimoto et al. . |
| 4,899,291 | 2/1990 | Tsukada et al. . |
| 4,920,427 | 4/1990 | Hirata ...................................... 358/437 |
| 4,989,163 | 1/1991 | Kawamata et al. ..................... 364/519 |
| 5,010,513 | 4/1991 | Ueda . |
| 5,031,115 | 7/1991 | Hayashi . |
| 5,083,264 | 1/1992 | Platteter et al. . |
| 5,150,454 | 9/1992 | Wood et al. . |
| 5,150,455 | 9/1992 | Morikawa et al. . |
| 5,220,645 | 6/1993 | Nakajima . |
| 5,363,206 | 11/1994 | Fukushima ............................... 358/440 |
| 5,461,682 | 10/1995 | Nomura ................................... 382/232 |
| 5,664,074 | 9/1997 | Kageyama et al. . |

FOREIGN PATENT DOCUMENTS

| | | |
|---|---|---|
| 01202467 | 8/1989 | Japan . |
| 1-202467 | 8/1989 | Japan . |
| 05 301 429 | 11/1993 | Japan . |
| 07032665 | 2/1995 | Japan . |
| 08156343 | 6/1996 | Japan . |
| 08230237 | 9/1996 | Japan . |
| WO 88 10477 | 12/1988 | WIPO . |

OTHER PUBLICATIONS

Search Report for PCT Application No. PCT/US97/10339 date Feb. 18, 1998.
U.S. Patent Application serial No. 08/702,813, filed Jun. 7, 1993, abandoned.
U.S. Patent Application serial No. 08/061,923, filed May 14, 1993, abandoned.

*Primary Examiner*—Arthur G. Evans
*Attorney, Agent, or Firm*—Pillsbury Madison & Sutro

[57] ABSTRACT

A printer 10 stores print image data in memory 56 as the print image data is used by a print engine 12 to print an image in accordance with the print image data. In one embodiment, separate data buses (17, 46) and separate processors (40, 50) are used to transfer the print image data to the print engine and the memory so that the transfer operations can occur independently and in parallel. In another aspect, the print image data is compressed before it is stored in the memory. In yet another aspect, an overrun condition is detected when the transfer of data to the memory falls behind the transfer of data to the print engine. During the overrun condition, transfer of data to the memory is suspended until after the page has been printed.

23 Claims, 11 Drawing Sheets

IMAGE STORAGE AND RETRIEVAL FOR A PRINTER

This is a continuation-in-part application of Ser. No. 08/072,813, filed Jun. 7, 1993, which in turn is a continuation-in-part of application Ser. No. 08/061,923, filed May 14, 1993, entitled "Image Storage and Retrieval for a Printer", both abandoned.

BACKGROUND OF THE INVENTION

1. Field of the Invention

The present invention relates to printers, and more particularly, to printers having a memory for storing a print image.

2. Description of Related Art

One type of printer known as a "laser" printer employs an electrophotographic print engine in which the image to be printed onto paper or other media is first formed on a charged, light-sensitive drum by a laser which scans the drum. Laser printers typically require a complex internal microcomputer system which receives printing instructions from a host computer in a high level programming language such as PostScript™. These programming language instructions are processed by the printer microcomputer to produce data defining a two-dimensional image pixel by pixel. Because of the complexity of the processing task, the generation of the two-dimensional image data can be very time consuming, requiring as much as several minutes per page for images which include sophisticated graphics and complex fonts. As a consequence, much time is often wasted should the reprinting of one or more pages of a document be necessitated by a printer malfunction such as a paper jam.

Furthermore, when more than one copy of a document is required, the long processing time of the printer computer often makes it impractical to use the printer to print multiple copies. Instead, once the printer has printed one copy of the document, it is often faster to use a separate photocopying machine to produce the additional copies.

One approach for eliminating the need for a separate photocopier has been to program the printer to print multiple copies of each page of the document before processing and printing the next page of the document. Because the actual time required to print a page is relatively short (on the order of a few seconds or less), multiple copies of a page can be printed relatively quickly once the print image data of the page has been generated by the printer computer. However, the pages once printed must then be sorted and collated either manually or by a mechanical sorter to produce the multiple copies of the document. These mechanical sorters tend to be expensive and complex. In addition, because the sorter typically sorts the pages by directing individual pages into different bins, the number of copies which can be produced at one time is often limited by the number of bins. Similarly, the size of document is usually limited by the size of each bin.

To eliminate the need for mechanical sorters, it has been proposed to store into memory the print image data produced by the printer microcomputer. The stored print image data for each page is then read from the memory in a cyclical fashion so that the pages are printed in the correct order to produce multiple copies without the need for additional sorting. However, because of the high resolution of some images, the microcomputer typically requires a large amount of internal random-access-memory (RAM) for the computational tasks alone. Moreover, some sophisticated laser printers may employ a hard disk as well for handling complicated, high definition images. Consequently, memory space in printer computer systems is often at a premium.

To store the print image data for a single page typically requires a significant amount of memory space. A monochrome image at 300 dots per inch on a 8½×11 inch page, can require one megabyte of memory. This memory requirement quickly escalates for color or high definition images and is multiplied by each page of the document to be printed. To meet these requirements, it has been proposed in U.S. Pat. No. 4,597,018, for example, to store print image data on a read/write magneto-optical disk. Although optical disks can store large amounts of information (typically on the order of a gigabyte or more), such memory storage devices tend to be relatively expensive and slow.

SUMMARY OF THE INVENTION

It is an object of the present invention to provide an improved printer obviating, for practical purposes, the above mentioned limitations, particularly, in a manner requiring a relatively uncomplicated electronic and electromechanical arrangement.

These and other objects and advantages are achieved in a printer in which, while print image data is being transferred from a print image memory to a print engine for printing, the same print image data is also being transferred to a mass memory for storage independently and in parallel with the transfer of print image data to the print engine. As a consequence, the processing of the print image data by the print engine is not slowed by the parallel storing of a backup copy of the print image data. Thus, should a paper jam occur, the print image data for those pages which need to be reprinted can be readily retrieved from the mass storage device, obviating the need for regeneration of the print image data for those pages by the printer microcomputer system.

In the illustrated embodiment, the microcomputer system stores print image data in a print image memory as the print image data is generated from instructions received from the host computer. In one aspect of the invention, print image data is transferred simultaneously to two intermediate memories, a first intermediate memory coupled by a first data bus to the print engine and a second intermediate memory coupled by a second, separate data bus to the mass storage memory. Data transfers from the second intermediate memory to the mass memory are performed on the second data bus by an independent direct memory access controller. In this manner, the data transfers to the print engine and the mass memory can operate independently and in parallel so as not to slow the printing process.

In another aspect of the present invention, the print image data to be stored in the mass memory is first compressed by a compression processor on the second bus before being stored in the mass memory in a compressed format. Should a particular page need to be reprinted as a result of a paper jam or to produce multiple copies, the compressed print image data is retrieved from the mass memory and expanded by an expansion processor on the second bus being before forwarded to the print engine for printing. As a consequence, the amount of memory space required to store the print image data in the mass memory is substantially reduced. In addition, the compression and expansion of the print image data takes place independently from the main processor of the microcomputer system of the printer. As a result, the print image data compression, storage and subsequent expansion do not burden the main processor of the microcomputer system which performs the intensive image rendering. Still further, the independent compression/expansion processor can retrieve and expand the previously stored compressed print image data such that, for many printers, the print engine is supplied print image data at a rate which permits the print engine to print pages at its maximum speed.

In yet another aspect of the present invention, the compression and storage of the print image data are monitored while the print image data is being printed. Should the compression and storage operation fall behind the printing operation indicating an overrun condition, compression and storage is temporarily suspended so as not to hinder the printing operation. Print image data in the print image memory which was printed but not compressed and stored is preserved until the compression and storage operation for the entire page is completed. This feature further facilitates the use of the present invention in very high speed printer applications.

DETAILED DESCRIPTION OF THE DRAWINGS

Figure 1:
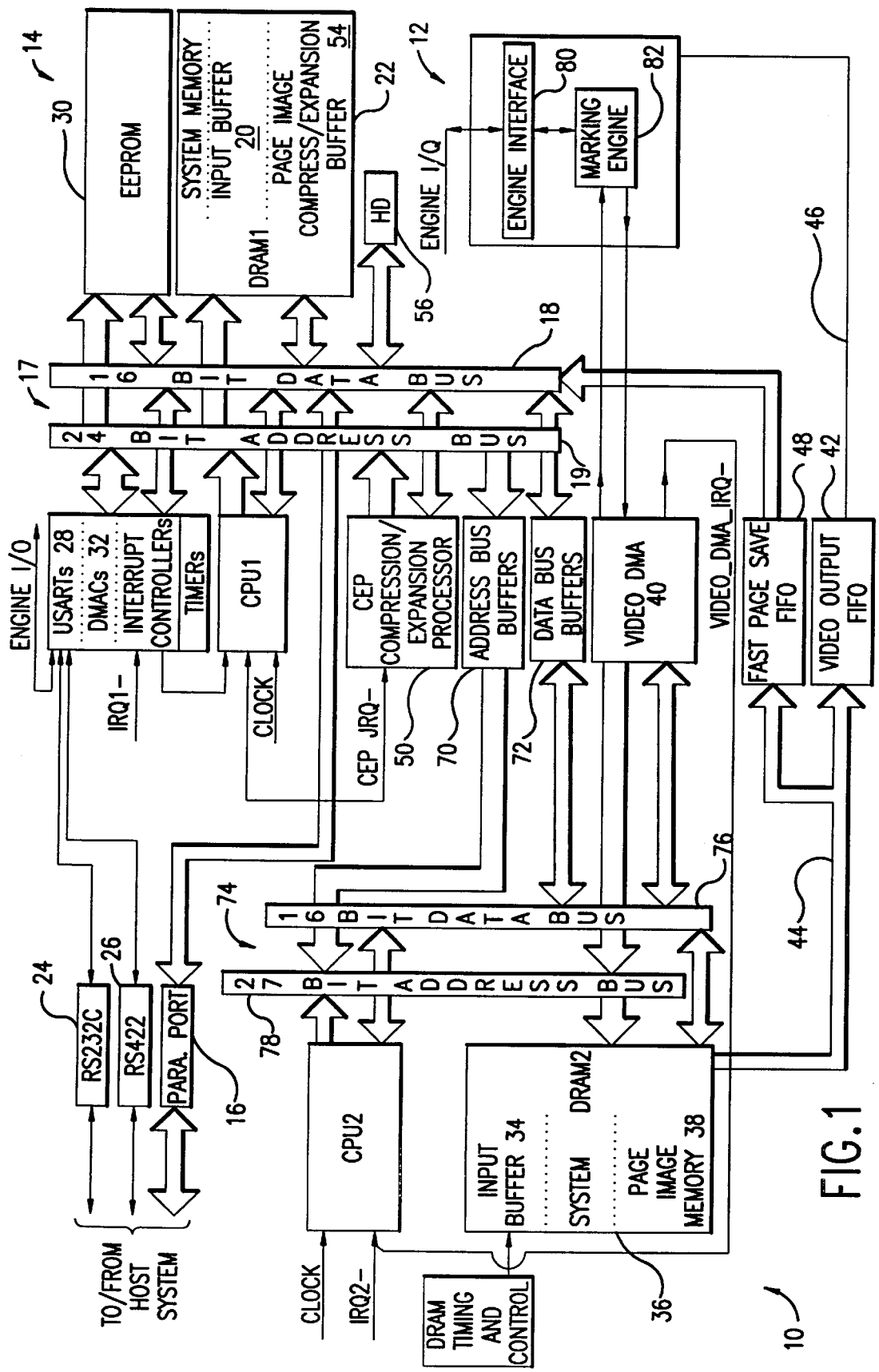
FIG. 1 is a schematic block diagram of a printer in accordance with one embodiment of the present invention.

A printer in accordance with one embodiment of the present invention is indicated generally at 10 in the schematic diagram of FIG. 1. The printer 10 includes a print engine 12 which prints an image onto paper or other media in response to print image data generated by a microcomputer system 14. In the illustrated embodiment, the print engine 12 is a laser scanned electrophotographic drum type print engine although it is anticipated that other types of print engines may be used as well.

The microcomputer system 14 of the printer 10 receives print instruction data from a host computer system (not shown) through a parallel port 16. A bus 17 which includes a data bus 18 and an address bus 19, couples the parallel port 16 to the input buffer portion 20 of a memory array 22. Alternatively, print instruction data from the host system may be received through one of two serial ports, an RS 232C port 24 or an RS 422 port 26, which are coupled through universal synchronous/asynchronous receiver/transmitters (USARTs) 28 to the bus 17.

A first microprocessor CPU1 under the control of a program stored in an electrically erasable programmable read only memory (EEPROM) 30, directs a direct memory access (DMA) controller 32 to transfer the print instruction data stored in the first input buffer 20 of the first memory array 22 to a second input buffer 34 of a second memory array 36. A second microprocessor CPU2 of the microcomputer system processes the print instruction data which may be in the form of, for example, instructions in a high level programming language such as PostScript™, to produce print image data which is stored on a pixel by pixel basis in a page image memory 38 of the memory array 36. Once there is sufficient page image data stored in the page image memory 38 (typically data for one complete page), the second microprocessor CPU2 directs a second direct memory access controller, Video DMA 40, to transfer page image data directly from the page image memory 38 to a first intermediate memory, Video Output first-in, first-out memory (FIFO) 42, over a private unidirectional bus 44 coupling the output of the memory array 36 to the input of the Video Output FIFO 42. The print image data stored in the video output FIFO 42 is then transferred over another unidirectional bus 46 to the print engine 12 to print the page.

In accordance with one aspect of the present invention, the print image data from the print image memory 38 is simultaneously stored via the bus 44 in a second intermediate memory, a "Page Save" FIFO 48, at the same time the page image data is stored in the Video Output FIFO 42. The output of the Page Save FIFO 48 is coupled to the first bus 17. Independently and in parallel with the transfer of page image data from the Video Output FIFO 42 to the print engine 12, a compression/expansion processor (CEP) 50 also coupled to the first bus 17, reads the page image data stored in the Page Save FIFO 48, compresses the page image data and stores the compressed page image data in a buffer 54 of the first memory array 22. Once a full page of image data has been compressed and stored in the buffer 54, the first CPU1 directs the DMA controller 32 to store the compressed page of image data from the buffer 54 into a hard disk drive 56. Because the compression and storage of the page image data into the hard disk drive 56 occurs separately and independently from the transfer of data from the video output FIFO 42 to the print engine 12, the compression and storage operation does not hinder or slow down the page printing operation.

Figure 2:
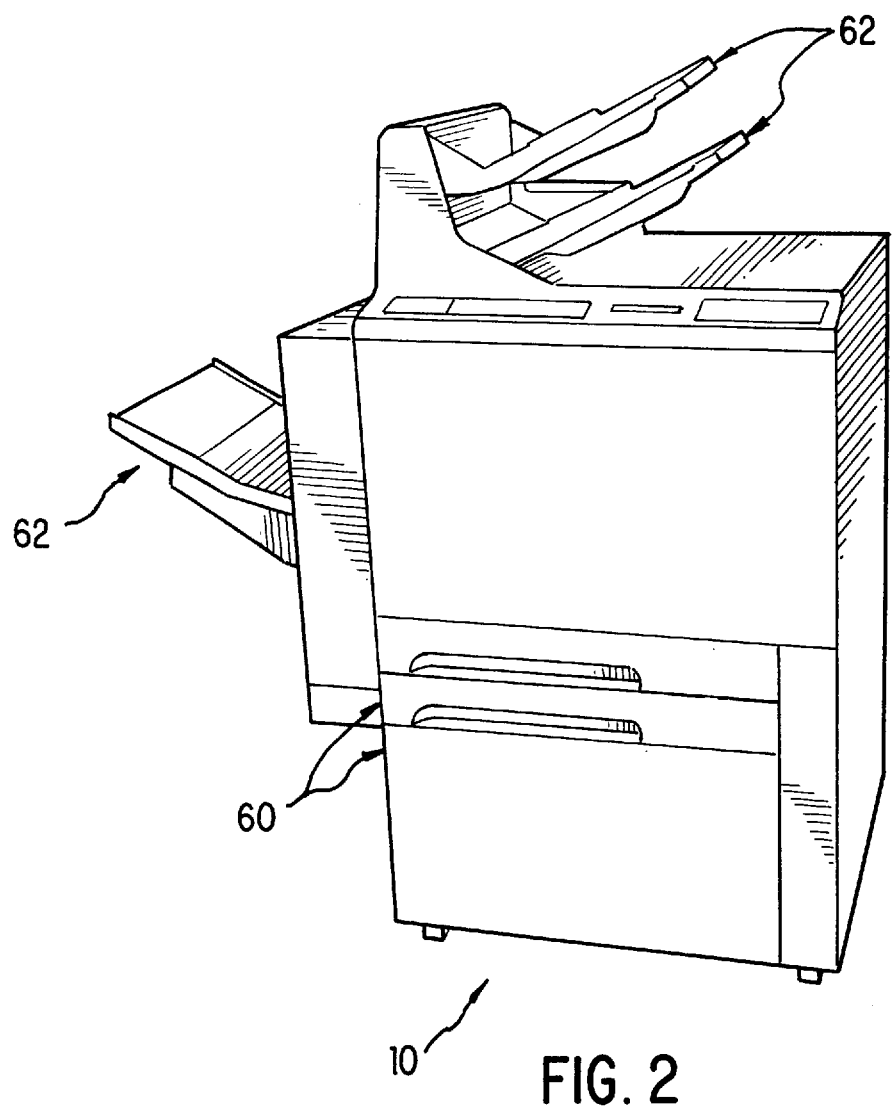
FIG. 2 is a pictorial view of the printer of FIG. 1.

FIG. 2 is a pictorial view of the printer 10 depicted schematically in FIG. 1. The printer 10 has one or more paper trays 60 from which paper is fed to the print engine 12 (FIG. 1) one sheet at a time. Once the page image has been imprinted on a sheet, the sheet is transferred to one or more output bins 62 where it is stacked with the previously printed sheets. In many printer designs, there may be a number of sheets to be printed or already printed sheets which are mechanically transported from the paper hopper, through the print engine and to the output bin at any one particular time. Hence, if a paper jam occurs, it may be necessary to reprint more than one sheet of paper. This is particularly troublesome when the pages to be reprinted are complex documents which require a substantial length of time for the printer microcomputer system to generate the print image data for the sheets which need to be reprinted. However, in the printer of the illustrated embodiment of the present invention, compressed print image data has previously been stored on the hard disk 56 (FIG. 1) as each page has been printed. Consequently, should pages need to be reprinted, the page image data for each page to be reprinted can be readily read from the hard disk 56, decompressed and transferred to the print engine 12 to reprint the page without the necessity for time-consuming regeneration of the print image data. Moreover, multiple copies of the document can be readily printed merely by repeatedly accessing the previously stored print image data from the hard disk. Still further, the print image data for each page can be accessed from the hard disk in such a manner that the pages can be printed in any order desired. Consequently, the need for expensive and complicated mechanical paper sorters is eliminated.

In the illustrated embodiment, the compression/expansion processor 50 is implemented with a uPD 72186 integrated circuit chip marketed by NEC. This integrated circuit chip compresses and expands two-tone bit image data in accordance with the International Telegraph and Telephone Consultative Committee (CCITT) recommendations. The protocols of these representations allow highly efficient storage and transfer of two-tone pictures and documents without loss of information.

The essence of data compression is the elimination of redundancy. Both one dimensional and two dimensional coding strategies have been developed. In one dimensional coding, run lengths of identical pixels in a horizontal scan line are represented by codes which are usually shorter than the run length. For example, a run length of 55 white only pixels (i.e., no black pixels in the run), is represented by an 8-bit code, 01011000. Thus, if the page image data for a page to be printed contains a run of 55 white pixels, the compression/expansion processor 46 recognizes the run of 55 white pixels in the page image data and stores the code 01011000 on the hard disk 56 to represent that run of 55 white pixels rather than 55 bits of page image data. It is readily appreciated that the code 01011000 requires substantially less space to store on the hard disk 52 than that required for 55 bits of uncompressed page image data.

When the compressed page image data is read from the hard disk, the compression/expansion processor 50 expands the compressed data back to the uncompressed format for printing. Thus, for example, the 8-bit code 01011000 is recognized by the compression/expansion processor 50 as representing a run of 55 white pixels and therefore the processor 50 converts this code to 55 bits of page image data representing a horizontal line of 55 contiguous white pixels. The expanded page image data is stored by the compression/expansion processor 50 in the page image memory 38 for subsequent transfer to the print engine 12 for printing.

In the illustrated embodiment, the NEC uPD 72186 compression/expansion processor integrated circuit chip utilizes a modified Huffman (MH) one-dimensional compression algorithm which is capable of achieving reduction ratios of 15:1 to 30:1 or higher, depending upon the complexity of the document being compressed. The NEC UPD 72186 integrated circuit chip is also capable of performing two dimensional compression algorithms, namely modified relative element address designate (modified READ or MR) and modified modified READ (MMR) two-dimensional coding as well.

Figure 3A:
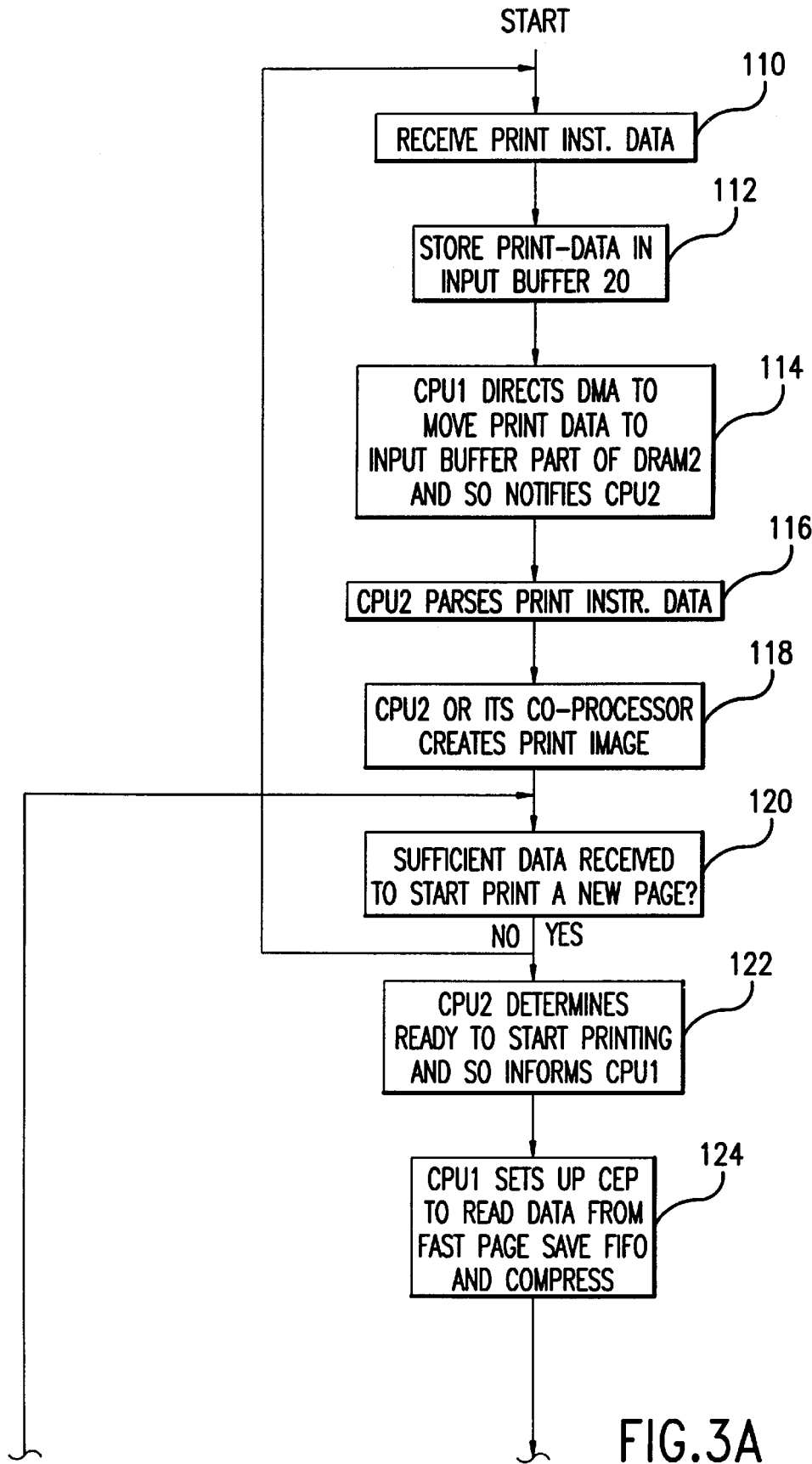
FIG. 3 is a flow diagram depicting the print image data compression and storage process of the printer of FIG. 1.
Figure 3B:
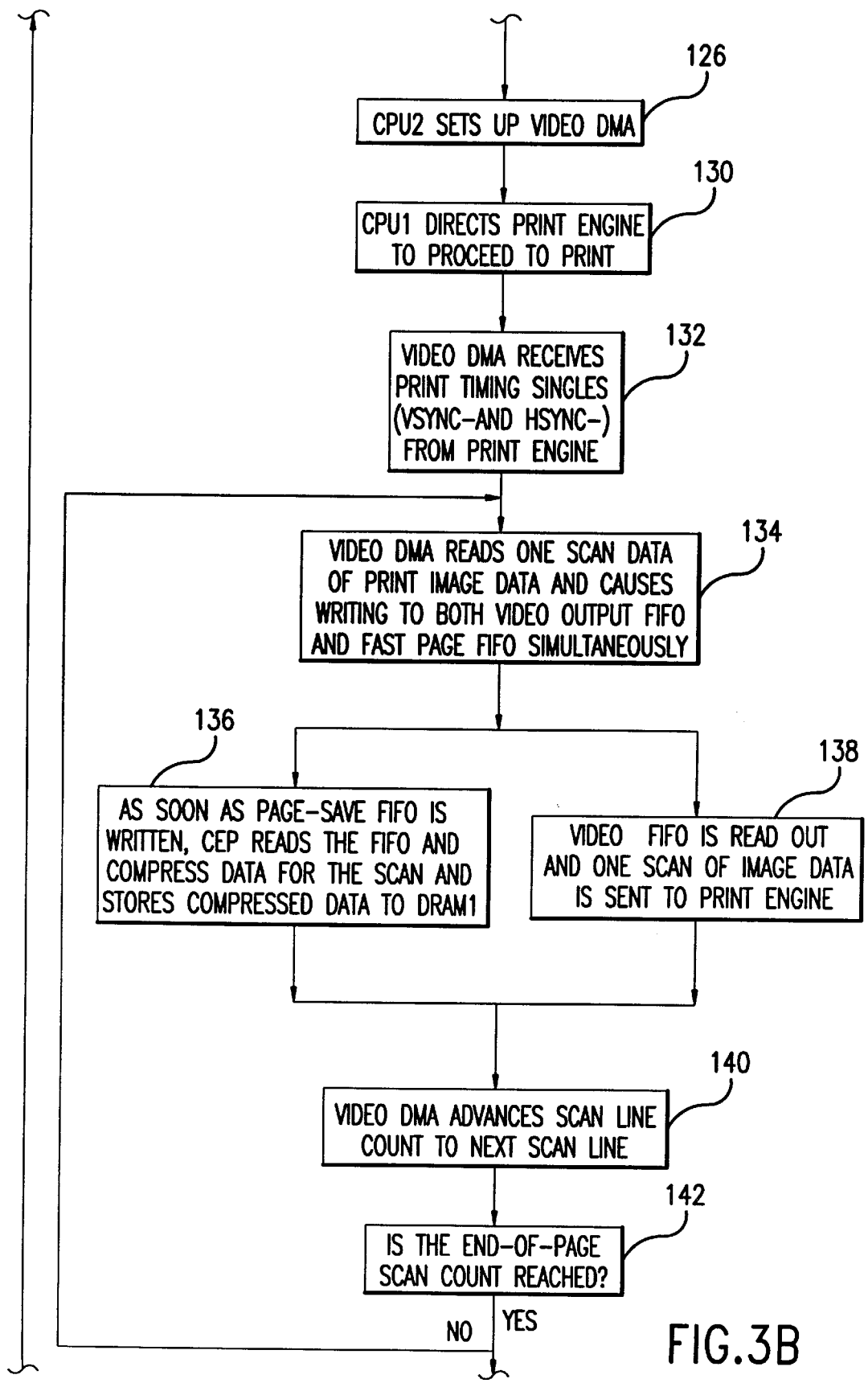
Figure 3C:
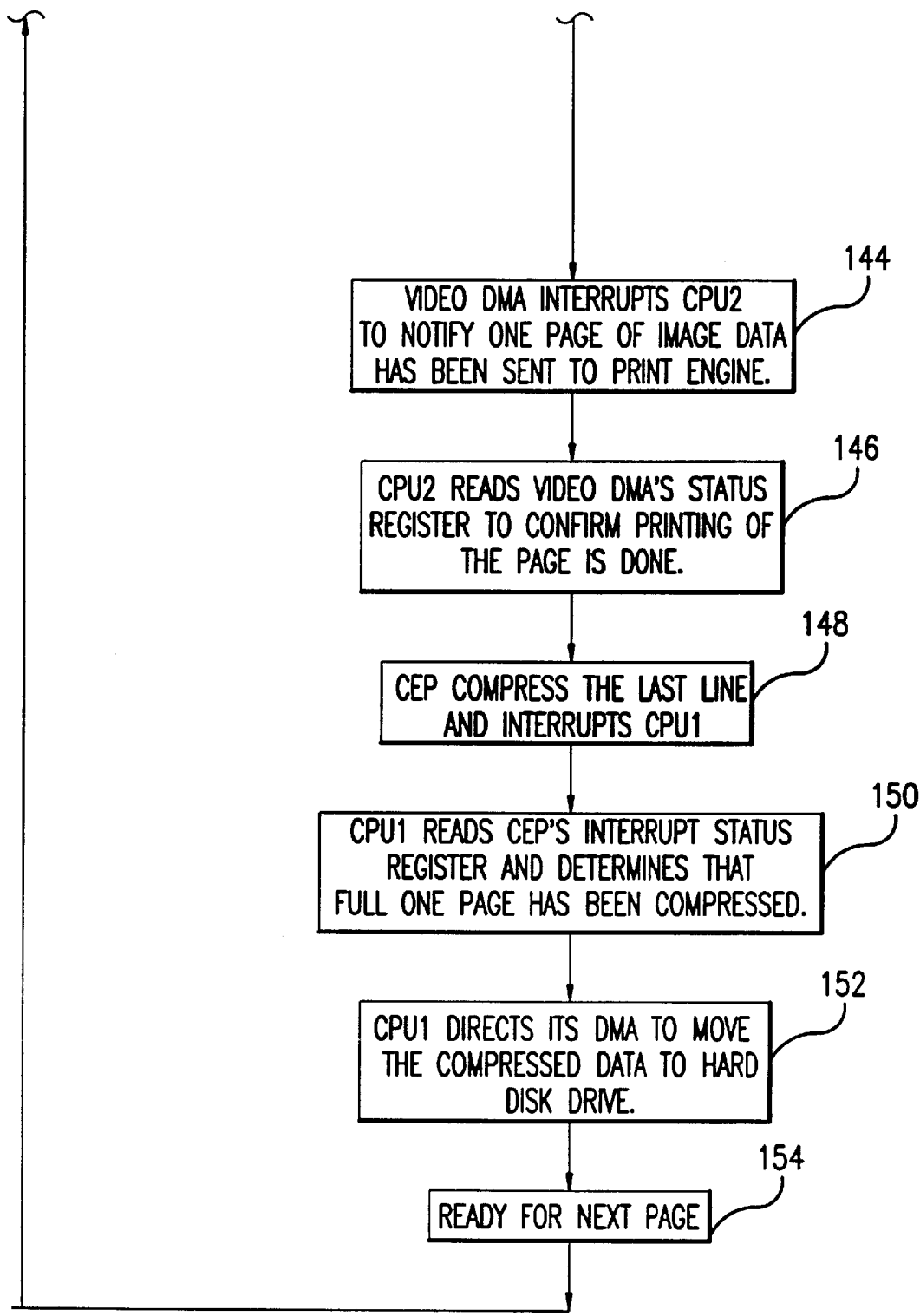

A more detailed explanation of the concurrent storage and printing of the print image data will now be provided in connection with both FIGS. 3 and 1. As set forth in step 110, the printer 10 receives the print instruction data from the host computer. The print instruction data is stored (step 112) in the input buffer 20 of the memory array 22. The CPU1 directs (step 114) the DMA 32 to move the print instruction data from the input buffer 20 of the memory array 22 to the input buffer 34 of the memory array 36. The print instruction data is transferred from the memory array 22 via the bus 17 which is coupled to address bus buffers 70 and data bus buffers 72 which are, in turn, coupled by a second general bus 74 to the second memory array 36. The bus 74 includes a data bus 76 which is coupled to not only the data bus buffers 72 but also to the CPU 2, memory array 36 and the video DMA 40. An address bus 78 of the bus 74 is coupled to the address bus buffers 70, CPU2, memory array 36 and the video DMA 40. Once the DMA 32 completes the transfer of print instruction data from the input buffer 20 to the input buffer 34, the DMA 32 interrupts the CPU1 (at interrupt input IRQ1) which then informs (step 114) the CPU2 of the completed print instruction data transfer. The CPU2 then parses (step 116) the print instruction data and generates (step 118), on a pixel-by-pixel basis, print image data from the print instruction data and stores the generated print image data in the page image memory 38 of the memory array 36.

If the CPU2 has not received sufficient data (step 120) to initiate the printing of a new page, control is passed back to CPU1 (step 110) to receive additional print instruction data. On the other hand, if the CPU2 determines that it has received sufficient print instruction data to initiate the start of printing, the CPU2 so informs (step 122) the CPU1. The CPU1 in response initializes (step 124) the compression/expansion processor 50 to be ready to read print image data from the page save FIFO 48 and compress the data. At the same time, the CPU2 initializes (step 126) the video DMA 40 to be ready to transfer print image data from the page image memory 38.

Upon initialization, the video DMA 40 receives print timing signals from the print engine 12 which has been instructed to print by the CPU1 (step 130). A vertical sync (VSYNC) timing pulse is provided by the print engine 12 to the video DMA 40 for each page to be printed and a horizontal sync (HSYNC) timing pulse for each horizontal (scan) line to be printed.

Upon receipt of a horizontal sync pulse from the print engine 12, the video DMA 40 reads (step 134) one scan line of print image data from the page image memory 38 and writes the scan line of print image data to the page save FIFO 48 and to the video output FIFO 42 simultaneously. As soon as the print image data is written into the page save FIFO 48, the compression/expansion processor 50 reads (step 136) the page save FIFO 48 and compresses the scan line of print image data. The compressed print image data is stored by the compression/expansion processor 50 in the page image buffer 54 of the memory array 22. At the same time, the scan line of print image data is also read (step 138) from the video output FIFO 42 and transferred to the print engine 12. One scan line of pixels is then scanned by the laser onto the electrophotographic drum of the print engine 12 in accordance with the received scan line of print image data.

Because the page save FIFO 48, the compression/expansion processor 50 and the memory array 22 communicate over the bus 17 which is separate from the bus 46 coupling the video output FIFO 42 to the print engine 12, the compression/expansion processor 50 can read the print image data from the page save FIFO 48, compress the data and store the compressed data in the memory array 22 while the video DMA 40 simultaneously transfers the uncompressed print image data from the separate FIFO 42 to the print engine 12 for printing, without the two parallel processes interfering with each other. Once a complete scan line of print image data has been transferred to the print engine 12 and has been compressed and stored in the page image buffer 54, the video DMA 40 advances (step 140) the scan line count to the next scan line. The video DMA 40 reads (step 134) the next scan line of print image data and stores the print image data simultaneously into both the page save FIFO 48 and the video output FIFO 42 whereupon the scan line of print image data is forwarded to the print engine 12 for scanning a line of pixels onto the drum, and is compressed and stored in the page image buffer 54, as discussed above.

This process is repeated for each scan line of the page until the last scan line has been scanned, compressed and stored. Upon incrementing (step 140) the scan line count, the "end of page" scan count is reached (step 142) and the video DMA 40 interrupts (step 144) the CPU2 by activating the interrupt line video DMA IRQ coupled to the interrupt line IRQ2 of the CPU2. Activation of this interrupt indicates to the CPU2 that a complete page of image data has been sent to the print engine 12. In response, the CPU2 reads (step 146) the status register (not shown) of the video DMA 40 to confirm that the printing of the page has been completed.

After the last scan line of print image data has been compressed and stored, the compression/expansion processor 50 interrupts (step 148) the CPU1 by activating the interrupt line CEP IRQ. In response, the CPU1 reads (step 150) the interrupt status register (not shown) of the compression/expansion processor 50 and verifies that one full page of print image data has been compressed and stored. The CPU1 then directs (step 152) the DMA 32 to move the compressed print image data from the page image buffer 54 to the hard disk 56. The printer 12 is then ready (step 154) for the next page and returns control to step 120 for processing another page of print instruction data from the host computer.

Figure 4A:
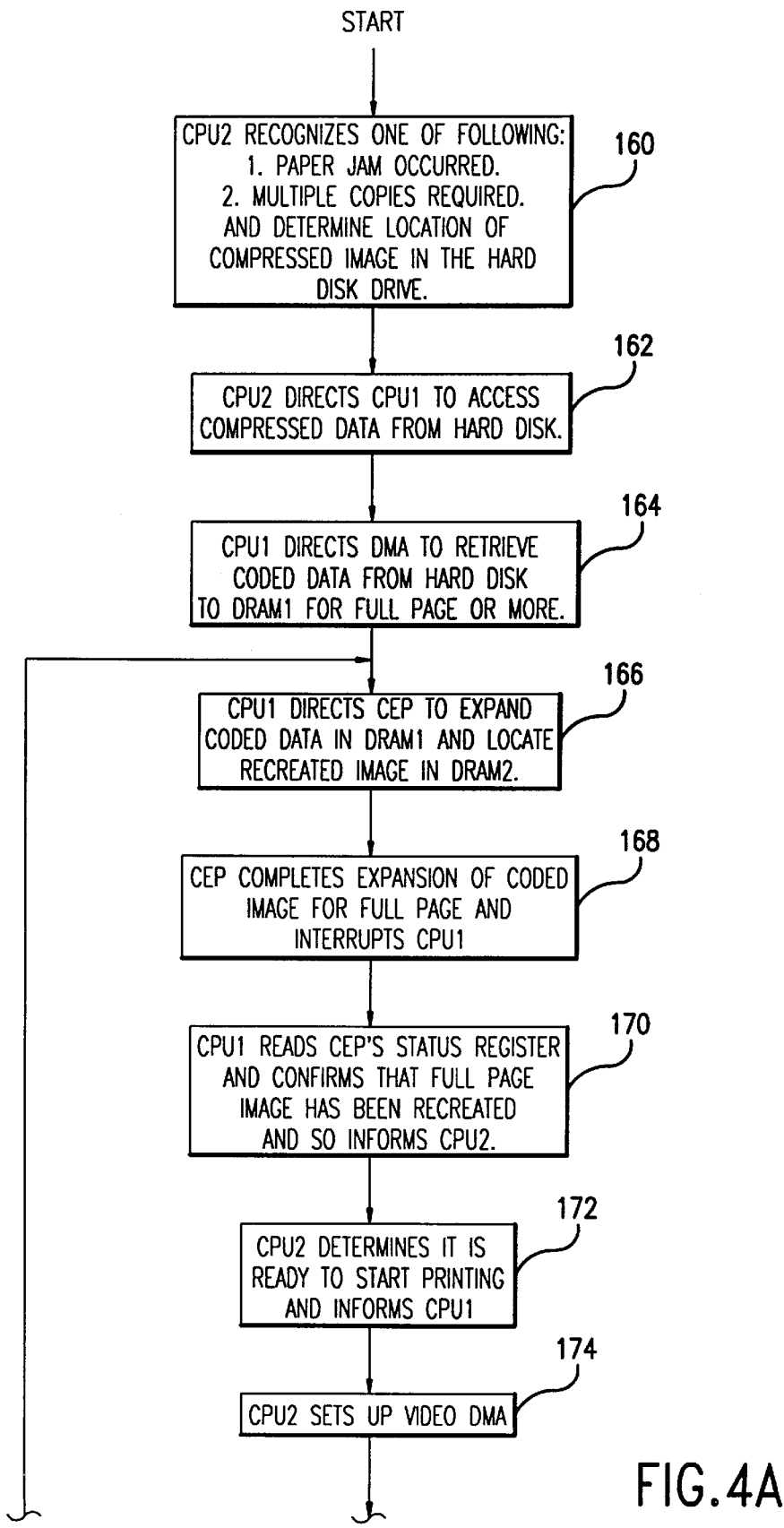
FIG. 4 is a flow diagram depicting the print image data expansion and printing process of the printer of the FIG. 1.
Figure 4B:
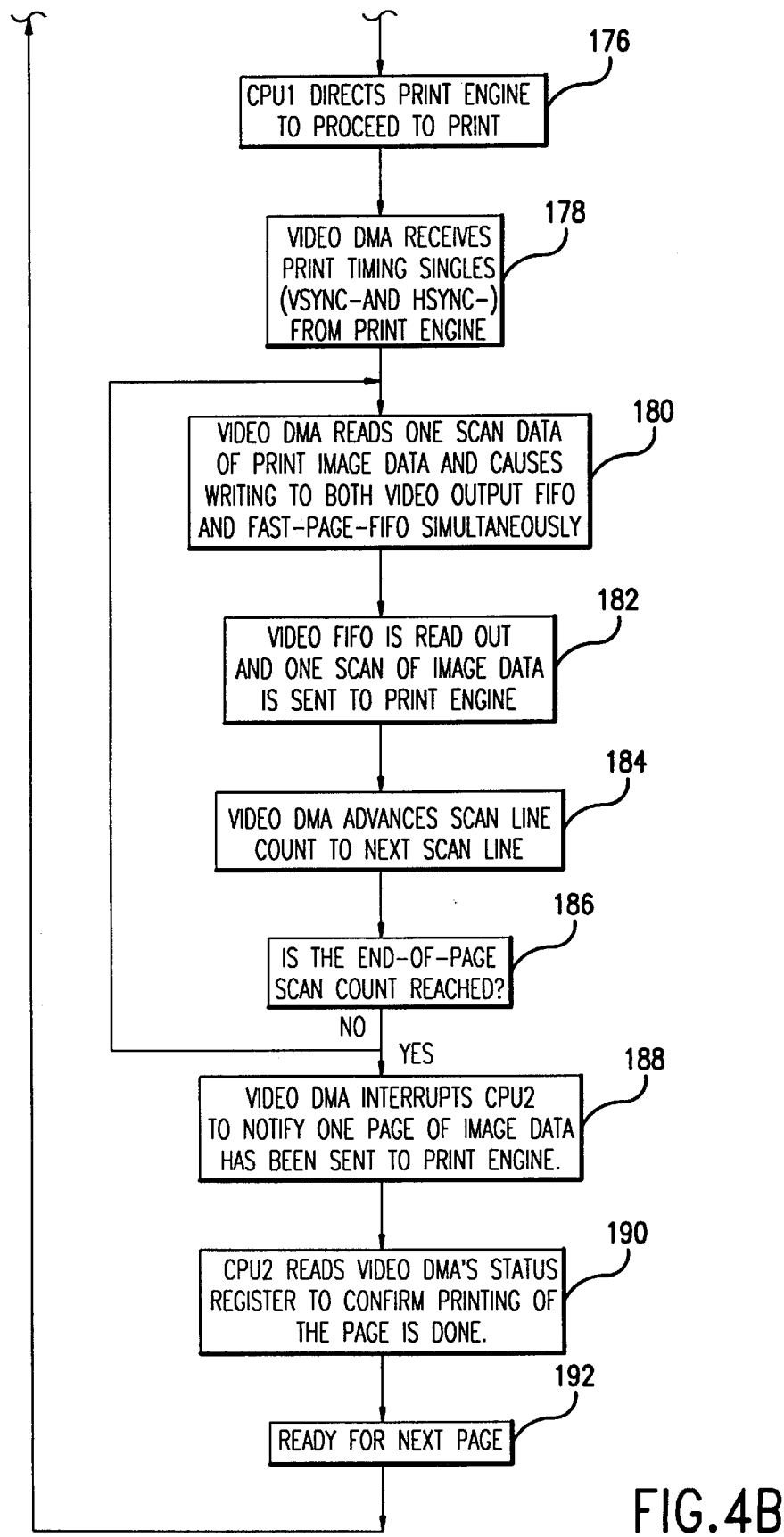

FIG. 4 illustrates the process for retrieval and expansion of compressed data previously stored on the hard disk drive 56. Should a page jam occur, the printer 12 has sensors (not shown) which can sense the page jam and signal the CPU2 of the microcomputer system 14. Alternatively, should the user require multiple copies of the pages being printed, this request can be forwarded by the host system to the microcomputer system 14 of the printer 12. The CPU2 recognizes (step 160) either of these conditions, a page jam or a multiple copy request, and determines the location in the hard disk drive 56 of the compressed print image data required to reprint the desired pages. The CPU2 directs (step 162) the CPU1 to access the compressed print image data from the hard disk 56 at the location determined by the CPU2. The CPU1 in turn directs (step 164) the DMA 32 to retrieve the compressed print image data from the hard disk 56 and transfer it to the page image buffer 22. In the illustrated embodiment, the DMA 32 transfers the compressed print image data for a full page or more before proceeding to the next step. The CPU1 directs the compression/expansion processor 50 to retrieve the compressed print image data from the page image buffer 54, expand the data and store the recreated page image in the page image memory 38 of the memory array 36 (step 166). Upon completion of the expansion of the compressed data for a full page, the compression/expansion processor 50 interrupts (step 168) the CPU1 which in response, reads (step 170) the status register (not shown) of the compression/expansion processor to confirm that a full page of print image data has been retrieved, expanded and stored in the page image memory 38. The CPU1 then informs the CPU2 that a full page of expanded print image data awaits in the page image memory 38. The CPU2 in response determines (step 172) that it is ready to start printing and so informs the CPU1. The printer 12 then proceeds to print the page of print image data as set forth in steps 172–192 in a manner similar to that described above in connection with FIG. 3. However, as the original pages are reprinted, the print image data is not compressed and stored again. Once a page has been reprinted (step 192), control returns to step 166 to retrieve another page of compressed print image data, expand the data and store the expanded print image data in the page image memory 38 so that another page can be reprinted.

In the process described in connection with FIG. 3, the print image data is read, compressed and stored one scan line at a time by the compression/expansion processor 50. Alternatively, a direct memory access processor may be utilized to read the page save FIFO 48 and store the data in the page image buffer 54 in an uncompressed format until a full page or more has been stored. The compression/expansion processor 50 may then be used to read the uncompressed print image data from the page image buffer 54, compress the image data and store the compressed print image data back into the page image buffer 54 for later transfer to the hard disk. This alternative process facilitates two-dimensional compression which achieves higher compression rates although can be more time consuming and can require a larger page image buffer 54.

In yet another approach, the compression/expansion processor 50 may be used to write compressed print image data directly to the hard disk drive 56. This approach reduces the utilization of random access memory and also eliminates the delay caused by data writes to the memory 54 and the subsequent data reads from the memory 54 to transfer the data to the hard disk drive 56.

Figure 5:
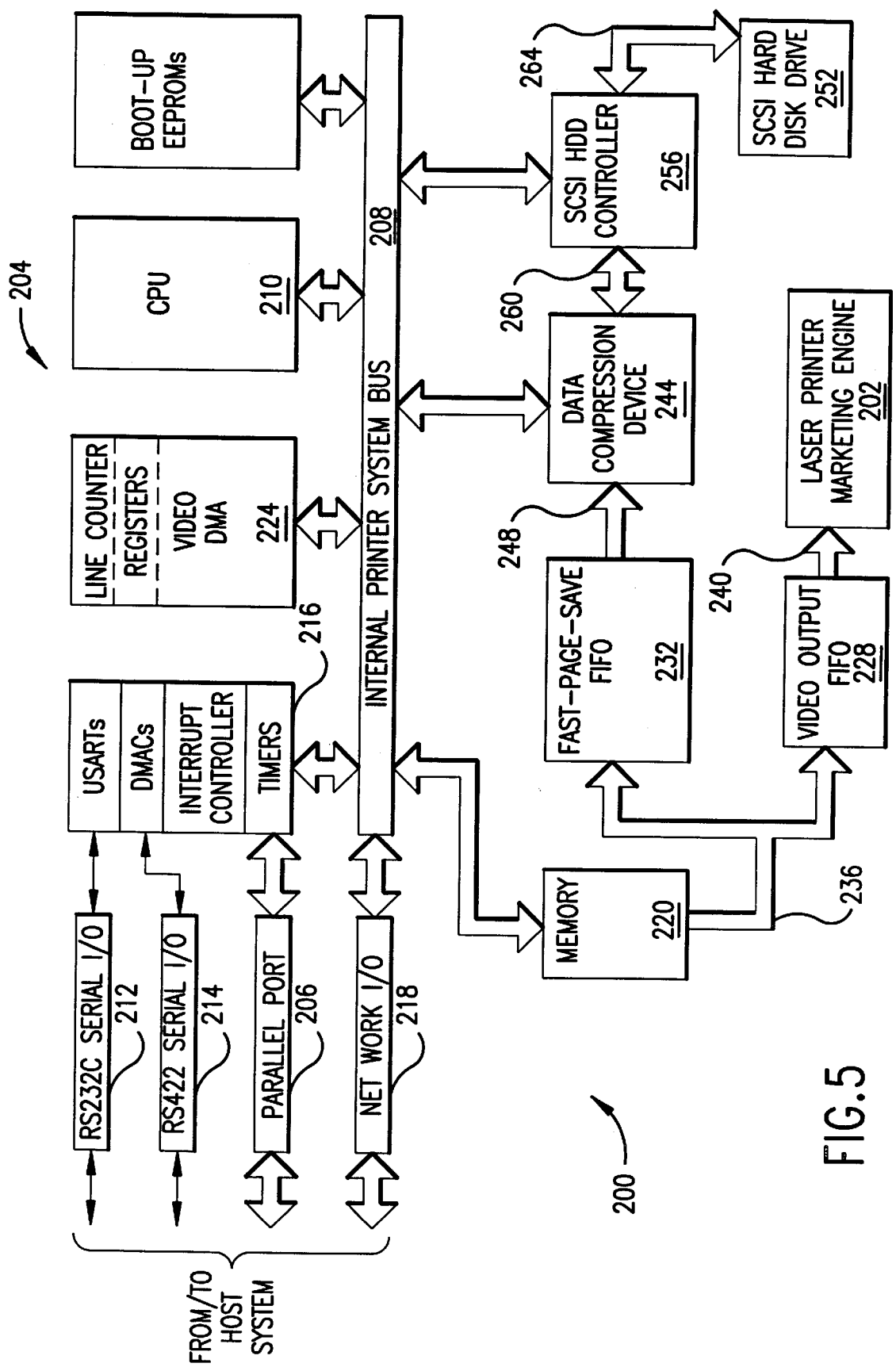
FIG. 5 is a schematic block diagram of a printer in accordance with a preferred embodiment of the present invention.

A printer in accordance with a preferred embodiment of the present invention is indicated generally at 200 in the schematic diagram of FIG. 5. As will be explained in greater detail below, the architecture of the printer 200 facilitates rapid processing of data and therefore may accommodate higher speed printer engines such as the laser printer marking engine 202 which may be a model MCP60 manufactured by Hitachi Kokai Co. Ltd., for example. The printer 200 includes a microcomputer system 204 which, like the microcomputer system 14 of the printer 10, receives print instruction data from a host computer system (not shown) through a parallel port 206. An internal printer system bus 208 couples the parallel port 206 to a CPU 210 of the microcomputer system 14. Alternatively, printer instruction data from the host system may also be received through one of two serial ports, an RS232C serial input port 212 or an RS422 serial input port 214, which are coupled through universal synchronous/asynchronous receiver/transmitters (USARTs) 216 to the internal printer system bus 208. The host system may connect directly to the internal printer system bus 208 through a network input/output port 218.

The CPU 210 of the microcomputer system 14 is preferably an IDT R4600 RISC chip, and processes the printer instruction data to produce print image data which is stored on a pixel-by-pixel basis in a page image memory section of a memory 220. In a manner similar to that described above in connection with the printer of FIG. 1, once there is sufficient page image data stored in the page image section of the memory 220 (which may be a dynamic RAM, for example), the microprocessor 210 directs a direct memory access controller, video DMA 224, to transfer print image data directly from the page image memory section of the memory 220 to a first intermediate memory, video output first in, first out memory (FIFO) 228 and at the same time to a second intermediate memory, a FIFO designated fast-page-save (FPS) FIFO 232, over a private unidirectional bus 236 coupling the output of the memory 220 to the inputs of both of the FIFO's 232 and 228. In order to reduce cost, the size of the FIFO's 232 and 228 are preferably limited to accommodate a single scan line of print image data. The video DMA 224 is preferably implemented with an application specific integrated circuit (ASIC) programmed as herein described and manufactured by AMI Semiconductor.

The print image data stored in the video output FIFO 228 is then transferred over another unidirectional bus 240 to the print engine 202 to print the page. Independently and in parallel with the transfer of print image data from the video output FIFO 228 to the print engine 202, a compression/expansion processor 244 coupled directly to an output of the FPS FIFO 232 by another unidirectional bus 248, reads the page image data stored in the FPS FIFO 232, compresses the page image data and stores the compressed page image data directly in a mass memory such as a hard disk drive 252 via a disk driver controller 256. The data compression device 224 is coupled to the controller 256 by a private bidirectional data bus 260 and the controller in turn is coupled to the hard disk drive 252 by another private bidirectional data bus 264. Because the compression and storage of page image data into the hard disk drive 252 occurs separately and independently from the transfer of data from the video output FIFO 228 to the print engine 202, the compression and storage operation does not hinder or slow down the page printing operation. Similarly, because the compression and storage of the page image data into the hard disk drive 252 occurs separately and independently from the transfer of data on the internal printer system bus 208, the compression and storage operation does not hinder or slow down the operations of the microprocessor 210 either.

In the illustrated embodiment of FIG. 5, the compression/expansion device 244 is implemented with an ALDC-20S integrated circuit chip marketed by IBM. This integrated circuit chip compresses and expands two-tone bit image data utilizing an LZ compression algorithm. It should be recognized, of course, that other algorithms and devices for compressing and expanding the print image data may be utilized.

Figure 6A:
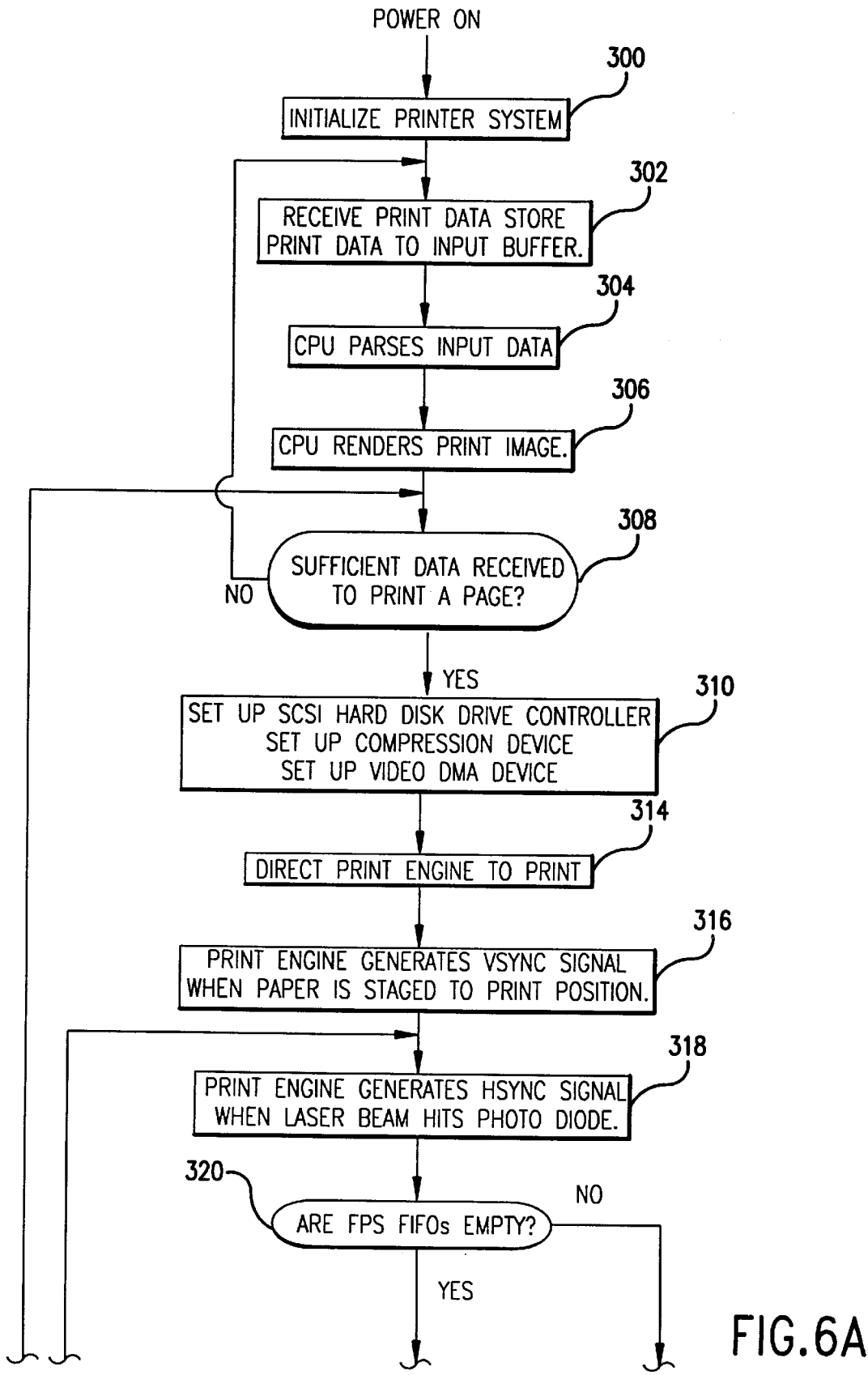
FIG. 6 is a flow diagram depicting the print image data compression and storage process of the printer of FIG. 5.
Figure 6B:
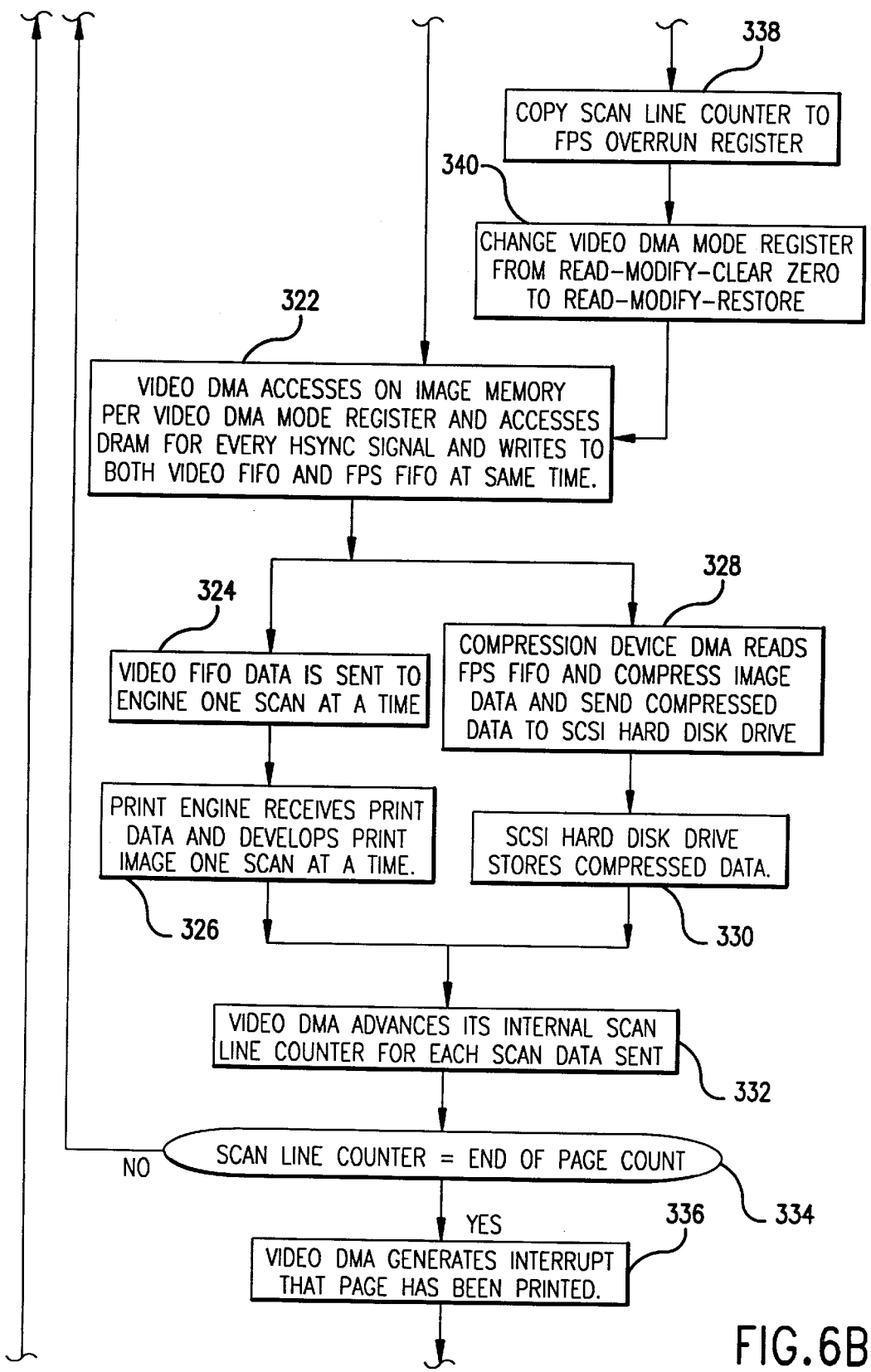
Figure 6C:
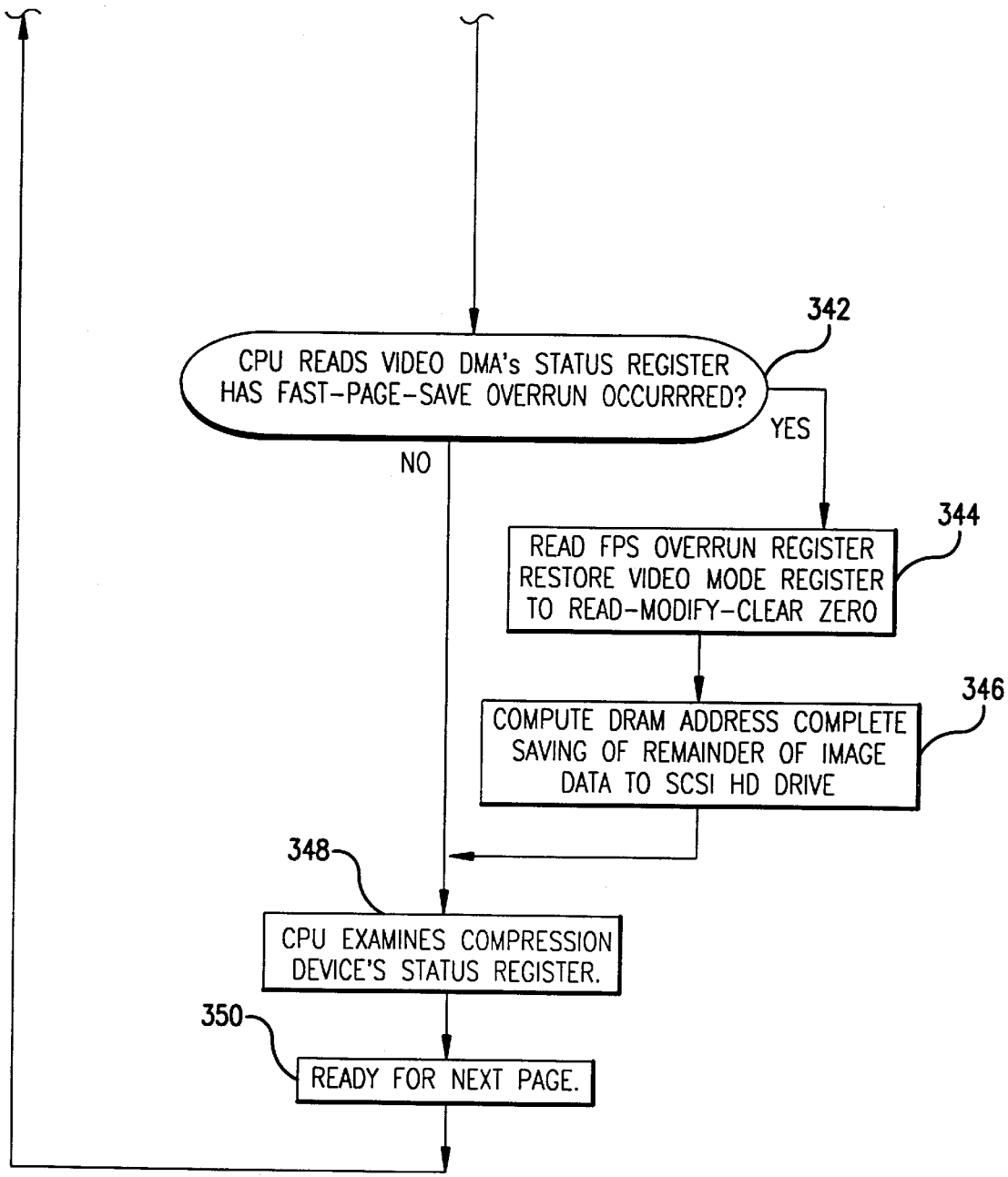

A more detailed explanation of the concurrent storage and printing of the print image data will now be provided in connection with both FIGS. 5 and 6. As set forth in step 300, after the printer 200 is powered on, the printer initializes its system and indicates its readiness to receive print data. As print data is received (step 302), the data is stored in an input buffer section of the memory 220, and the CPU 210 begins to parse (step 304) the print data. Once sufficient print data has been received, the CPU 210 acts on the parsed data and renders a print image (step 306) which is stored in the image memory section of the memory 220. When the CPU 210 determines that sufficient data has been received, parsed and rendered to print a page (step 308), the CPU 210 prepares (step 310) the hard disk controller 256, the compression device 244 and the video DMA 224. Then, the CPU 210 commands (step 314) the printer engine 202 to feed the paper (or other medium) and ready itself for printing. When the print medium arrives at the print drum of the print engine 202, a paper sensing device of the print engine 202 generates (step 316) a synchronization signal, vertical sync or VSYNC. Subsequently (or concurrently) the print engine generates (step 318) a second synchronization signal, horizontal synchronization signal, HSYNC, which is generated by a photodiode when the scanning laser beam of the print engine hits the diode. The video DMA 224 utilizes the HSYNC and VSYNC signals to transfer (step 322) print image data to the video output FIFO 228 and to the FPS FIFO 232. More specifically, after receipt of the vertical synchronization signal VSYNC, the video DMA 224 counts the horizontal synchronization signals HSYNC and after a predetermined number of HSYNC signals has been counted, the video DMA 224 reads one scan line of image data from the print image section of the memory 220 and transfers the data to both the video FIFO 228 and to the FPS FIFO 232 simultaneously.

The data stored in the video FIFO 228 by the DMA video 224 is sent serially (step 324) to the print engine 202 one bit at a time. The print engine 202 modulates the laser beam on and off in response to the serial data to develop (step 326) a latent image on the print engine drum, one scan line at a time. Simultaneous with this video operation of the print engine, once the FPS FIFO 232 receives any data, the compression device 244 reads (step 328) the FPS FIFO 232 and compresses the image data. The compressed data is transferred directly to the hard disk drive controller 256 which in turn stores (step 330) the compressed data in the hard disk drive 252. After one scan line of data has been transferred from the print image section of the memory 220 to both the FIFO's 228 and 232, the video DMA 224 increments (step 332) an internal scan line counter by one. If the scan line count is less than a predetermined number equal to the number of scan lines of the page, the video DMA controller 224 returns (step 334) back to step 318 to await the next horizontal synchronization signal HSYNC and transfer another scan line of data to the FIFO's 228 and 232 for processing. However, if the count of the scan line counter equals the predetermined count indicating that the end of the page has been reached (step 334), the video DMA generates (step 336) an interrupt to the CPU to indicate that the complete page has been printed.

Before the video DMA 224 transfers a scan line of data to the FIFO's 228 and 232, the video DMA first checks (step 320) the FPS FIFO 232 to determine if it is empty. If it is empty, the video DMA 224 proceeds to transfer (step 322) the next scan of print data to the FIFO's. However, if the video DMA determines that the FPS FIFO 232 is not empty, this indicates an overrun condition in which the parallel compression and hard disk storage operation on the print image data has fallen behind the video operation in which the print image data is transferred from the video output FIFO 228 to the print engine 202. The print engine 202 accepts data at a relatively high rate (such as 65 MHz, for example), and also relatively smoothly as the laser beam scans each line of the drum. However, although the data compression device 244, the hard disk drive controller 256 and the disk drive 252 can be very high speed devices, the hard disk drive 252 and to a certain extent the data compression device 244 as well may have data transfer rates which are not relatively smooth. Thus, on a scan line by scan line basis, the overall net transfer rate from the FPS FIFO 232 to the disk drive 252 can fluctuate significantly, depending upon the complexity of the print image data being compressed and the physical location of the storage data in the disk drive 252.

When the video DMA 224 determines (step 320) that the FPS FIFO 232 is not empty, the video DMA 224 copies (step 338) the contents of the video DMA scan line counter to an FPS overrun register which enables the video DMA 224 to keep track of the scan line at which the overrun condition occurred. In addition, the video DMA 224 acts to preserve the remaining print image data stored in the print image section of the memory 220 to prevent any data being lost as a result of the overrun condition.

In the illustrated embodiment, when the video DMA accesses the print image memory section of the memory 220 to transfer a scan line of data to the FIFO's 228 and 232, the video DMA 224 preferably operates on the memory 220 using a read-modified-write operation instead of a simple read operation. The read-modified-write operation performs both read and write operations to access the DRAM circuits of the memory 220 within the same cycle. Since much overhead time is typically involved with each DRAM access operation, performing both read and write zero operations (to erase the memory locations after the print image has been read from the memory) within the same DRAM cycle can reduce the amount of time required by 25% or more depending upon the detailed specifications of the DRAM devices. For example, read and write cycles if performed separately could require as many as four system clock periods each for a total of eight system clock periods. In contrast, one read-modified-write operation can require as few as six system clock periods, providing a saving of two clock periods.

Because of the substantial size of the print image memory which usually must be accessed for each page, such a 25% savings in time can be quite significant, especially for high speed, high resolution printers. However, accessing the next scan line of data and erasing that scan line of data after it has been read before the FPS FIFO 232, the data compression device 224, the controller 256 and the disk drive 252 have completed the compression and storage operation of the prior scan line of data, can result in data being lost as result of an overrun condition. Hence, once an overrun condition is detected (step 320) and the number of the scan line at which the overrun condition is detected is copied (step 338) to the FPS overrun register, the video DMA 224 changes (step 340) a mode register internal within the video DMA 224 to cause the read operations to change from read-modified-clear zero which erases the print image data after it has been read to a read-modified-restore operation which restores the print image data in the memory 220 as each scan line is read which preserves the print image data (step 322). Thus, as each subsequent scan line of data is read (step 322) by the video DMA 224 from the print image memory section of the memory 220, these remaining scan lines of print image data are not erased but are retained in the memory 220 until the remaining portion of the page has been printed.

In response to the interrupt generated (step 336) by the video DMA to indicate that the entire page has been printed, the CPU 210 reads (step 342) the status register of the video DMA 224 to determine if an overrun condition has occurred. If so, the CPU 210 reads (step 344) the FPS overrun register to determine the scan line at which the overrun condition first occurred. In addition, the video DMA mode register is reset to the read-modify-clear zero mode so that subsequent accesses of the print image section of the memory 220 are conducted in the read-modify-clear zero mode to erase the memory as each scan line is read. In addition, the CPU transfers (step 346) the print image data of the scan lines which were not compressed as a result of the overrun condition, directly over the internal printer system bus 208 to the data compression device 244, bypassing the fast-page-save FIFO 232. To do this, the CPU uses the scan line number stored in the FPS overrun register of the video DMA 224 to calculate the memory address of the scan line data at which the overrun condition was first detected. Starting at this calculated memory address, all the remaining print image data to the end of the page which was printed has not yet been compressed and stored as a result of the overrun condition. Accordingly, the CPU transfers this remaining print image data to the data compression device 224 which compresses the print image data from the memory 220 and stores it on the hard disk drive 252 via the controller 256. Once all the print image data has been transferred to the data compression device 244, the CPU 210 examines (step 348) the status register of the compression device 244 to determine if all of the print image data of the page has been compressed and transferred to the hard disk drive 252. Once the compression device status register indicates that all the print image data of the page has been compressed, the CPU 210 indicates (step 350) that it is ready for the next page and returns to step 308 to initiate the printing of the next page.

Because the compression device 244 of the illustrated embodiment utilizes information gained from prior scan lines to compress the print image data of the scan line being transferred to the compression device, it is preferred to suspend the transmission of print image data to the compression device in the event of an overrun condition and then resume the compression of the print image data of the page after the page has been printed. However, it is recognized that for compression devices that compress print image data on a scan line by scan line basis, the printer could alternatively resume the compression of the print image data before the print has been completed printing the page. For example, those scan lines of data which are printed during the overrun condition but not compressed could be marked and saved. Once the FPS FIFO is empty, the compression of print image data could be resumed at the scan line which the printer is presently ready to print. Once the page has been printed, the CPU could go back and compress those scan lines which were not compressed during the overrun condition and insert the compressed data at the appropriate locations in the disk memory 252 corresponding to the missing compressed scan lines. In addition, it is recognized that because the storage capacity of disk drives and other mass memory are increasing rapidly as their costs rapidly decrease, the compression of the print image data before storing the print image data in the mass memory is optional.

It is seen from the above that the illustrated embodiments of the present invention provide time efficient storage of image data to a more cost effective storage medium (e.g., the hard disk drive) by simultaneously transferring the image data to a set of memory areas (the Page Save FIFO) separate from the Video Output FIFO as a page is printed. As image data is transferred to the FIFOs for one raster at a time, the contents of the Page Save FIFO are read-out by a data compressor such that the size of the image data is reduced. The compressed data is subsequently stored to the hard disk drive. When the image is needed, the compressed image data is expanded to recreate the original page image. Should an overrun condition occur, print image data is preserved to ensure complete storage of each page. As a consequence, the following advantages and features are, among other features, efficiently provided: a) storage of page image data for jam recovery; (b) storage of page image data which are out of order with respect to the queue of the print engine (this is especially advantageous for duplex printing); and c) recreation of multiple copies of pre-imaged page images in the correct sequence of pages which allows the document set to be printed at the maximum rated engine print speed.

It will, of course, be understood that further modifications of the present invention, in its various aspects, will be apparent to those skilled in the art, some being apparent only after study and others being matters of routine electronic and mechanical design. For example, other type of integrated circuits may be utilized. Other embodiments are also possible, their specific designs depending upon the particular application. As such, the scope of the invention should not be limited by the particular embodiments herein described but should be defined only by the appended claims and equivalents thereof.

What is claimed is:

1. A printer, comprising:
   a print engine, responsive to print image data defining an image, for printing the image;
   a print image memory for storing print image data;
   a mass memory;
   data transfer means for transferring print image data defining a particular image from the print image memory both (1) to the print engine for the printing of the particular image in response to the transferred print image data; and also (2) to the mass memory for storing the print image data defining the particular image in the mass memory in parallel with the transfer to the print engine of the print image data defining the particular image.

2. The printer of claim 1 wherein the data transfer means includes monitoring means for monitoring the transfer of data to the mass memory and for suspending the transfer of data to the mass memory to prevent the transfer of data to the print engine from overrunning the transfer of data to the mass memory and for resuming the transfer of data to the mass memory.

3. The printer of claim 2 wherein the data transfer means further includes reading and overwriting means for reading the print image data from the print image memory and for selectively overwriting the data stored in the print image memory as it is read from the print image memory, and means responsive to the monitoring means for suspending the overwriting of data in the print image memory as the data is read from the print image memory if the transfer of data to the mass memory is suspended, and for resuming the overwriting of data in the print image memory when the transfer of data to the mass memory is resumed.

4. The printer of claim 1 wherein the data transfer means transfers print image data to the print engine and to the mass memory substantially simultaneously.

5. The printer of claim 1 wherein the data transfer means comprises first and second intermediate memories, the first intermediate memory being coupled to the print engine and the second intermediate memory being coupled to the mass memory, said data transfer means having means for transferring at least a portion of the print image data from the print image memory simultaneously into both the first and second intermediate memories.

6. The printer of claim 1 wherein the data transfer means has means for transferring the print image data stored in the mass storage from the mass storage to at least one of the print engine and print image memory.

7. The printer of claim 6 wherein the data transfer means further comprises means for compressing the print image data before it is stored in the mass storage.

8. The printer of claim 7 wherein the data transfer means has means for expanding the compressed print image data stored in the mass storage and transferring the expanded print image data to the print engine or print image memory.

9. A printer, comprising:

a print engine, responsive to print image data, for printing an image;

a print image memory for storing print image data; a mass memory;

a print image data compressor for compressing print image data;

a print image data expander for expanding compressed print image data;

data transfer means for (a) transferring print image data from the print image memory both (1) to the print engine for the printing of an image in response to transferred print image data; and also (2) to the compressor for compressing the print image data in parallel with the transfer of print image data to the print image; (b) for storing the compressed print image data in the mass memory; (c) for transferring the compressed print image data from the mass memory to the expander for expanding the compressed print image data; and (d) for transferring the expanded print image data to the print engine for the printing of an image in response to transferred expanded print image data.

10. A printer, comprising:

a print engine, responsive to print image data, for printing an image;

a print image memory for storing print image data; a mass memory for storing compressed print image data;

first and second intermediate memories, the first intermediate memory being coupled to the print engine and the second intermediate memory being coupled to the mass memory;

a print image data compressor for compressing print image data;

a print image data expander for expanding compressed print image data;

data transfer means having means for 1) storing a portion of the print image data from the print image memory into both the first and second intermediate memories; 2) transferring print image data from the first intermediate memory to the print engine for the printing of an image in response to the print image data from the first intermediate memory; 3) transferring print image data from the second intermediate memory to the data compressor to be compressed; 4) storing compressed print image data in the mass memory; 5) transferring compressed print image data from the mass storage to the data expander to be expanded; and 6) storing expanded print image data in the print image memory for subsequent transfer to the print engine for the printing of an image in response to the expanded print image data.

11. The printer of claim 10 wherein the data transfer means includes monitoring means for monitoring the transfer of data from the second intermediate memory to the print image data compressor and for suspending the transfer of data from the second intermediate memory to the print image data compressor to prevent the transfer of data to the print engine from overrunning the transfer of data to the print image compressor and for resuming the transfer of data to the print image compressor.

12. The printer of claim 11 wherein the data transfer means further includes reading and overwriting means for reading the print image data from the print image memory and for selectively overwriting the data stored in the print image memory as it is read from the print image memory, and means responsive to the monitoring means for suspending the overwriting of data in the print image memory as the data is read from the print image memory if the transfer of data to the print image data compressor is suspended, and for resuming the overwriting of data in the print image memory when the transfer of data to the compressor is resumed.

13. A printer, comprising:

a print engine, having an input and being responsive to print image data, for printing an image;

a print image memory having an input and an output, for storing print image data;

a first data transfer bus coupling the output of the print image memory to the input of the print engine;

a print image data compressor having an input and an output, for compressing print image data;

a mass memory having an input and an output, for storing compressed print image data;

a print image data expander having an input and an output, for expanding compressed print image data; and a second data transfer bus coupling the output of the print image memory to the input of the data compressor, the output of the data compressor to the input of the mass storage, the output of the mass storage to the input of the data expander, and the output of the data expander to the input of the print image memory.

14. A method of printing print image data, comprising:

transferring at least a portion of print image data from a print image memory to a print engine to print an image in response to transferred print image data; and transferring said portion of print image data also to a mass memory in parallel with said data transfer to the print engine, to store said portion of print image data in the mass memory.

15. The method of claim 14 further comprising the step of transferring print image data from the mass memory to the print engine to print an image in response to transferred print image data.

16. A method of printing print image data, comprising:

a) accessing print image data from a print image memory;

b) performing the following step b1 in parallel with the following steps b2i–b2ii:

b1) printing an image based on print image data accessed from the print image memory;

b2i) compressing print image data accessed from the print image memory; and b2ii) storing compressed print image data in the mass memory;

c) accessing compressed print image data from the mass memory;

d) expanding compressed print image data accessed from the mass memory; and e) printing an image based on expanded print image data.

17. The method of claim 16 further comprising the step of detecting6 a paper jam condition after performing steps b2i–b2ii and subsequently performing steps c–e.

18. A method of printing print image data, comprising:

a) transferring at least a portion of the print image data from a print image memory into both first and second intermediate memories;

b) performing the following steps b1i–b1ii in parallel with the following steps b2i–b2iii:

b1i) accessing print image data from the first intermediate memory; and b1ii) printing an image based on print image data accessed from the first intermediate memory;

b2i) accessing print image data from the second intermediate memory;

b2ii) compressing print image data accessed from the second intermediate memory; and b2iii) storing compressed print image data in the mass memory;

c) accessing compressed print image data from the mass memory;

d) expanding compressed print image data accessed from the mass memory;

e) storing expanded print image data into the print image memory;

f) accessing expanded print image data from the print image memory; and g) printing an image based on expanded print image data accessed from the print image memory.

19. The method of claim 18 further comprising the step of detecting a paper jam condition after performing steps b2i–b2iii and subsequently performing steps c–g.

20. A method of printing multiple copies of a document comprising a plurality of pages, the method comprising:

1) repeating for each page the following steps a and b until each page of the document has been printed:

a) transferring print image data from a print image memory into both first and second intermediate memories;

b) performing the following steps b1i–bb1ii in parallel with the following steps b2i–b2iii:

b1i) accessing print image data from the first intermediate memory; and b1ii) printing a page based on print image data accessed from the first intermediate memory;

b2i) accessing print image data from the second intermediate memory;

b2iii) compressing print image data accessed from the second intermediate memory; and b2iii) storing compressed print image data for the page being printed by the print engine in the mass memory;

2) repeating for each copy the following step c until all copies have been printed;

c) repeating for each page the following steps c1–c5 until all pages of a copy have been printed;

c1) accessing compressed print image data from the mass memory;

c2) expanding compressed print image data accessed from the mass memory;

c3) storing expanded print image data into the print image memory;

c4) accessing expanded print image data from the print image memory; and c5) printing a page based on expanded print image data accessed from the print image memory.

21. A method of printing a plurality of pages onto a plurality of pages of paper using a printer in which a paper jam condition can occur, the method comprising:

1) repeating for each page the following steps a and b until a plurality of pages have been printed:

a) transferring print image data from a print image memory simultaneously into both first and second intermediate memories;

b) performing the following steps b1i–bb1ii in parallel with the following steps b2i–b2iii:

b1i) accessing print image data from the first intermediate memory; and b1ii) printing a page based on print image data accessed from the first intermediate memory;

b2i) accessing print image data from the second intermediate memory;

b2iii) compressing print image data accessed from the second intermediate memory; and b2iii) storing compressed print image data for the page being printed by the print engine in the mass memory;

2) detecting a paper jam condition;

3) repeating for each page the following steps c1–c5 until all pages of a predetermined number of pages have been reprinted;

c1) accessing compressed print image data from the mass memory;

c2) expanding compressed print image data accessed from the mass memory;

c3) storing expanded print image data into the first intermediate memory;

c4) accessing expanded print image data from the print image memory; and c5) reprinting a page based on expanded print image data accessed from the print image memory.

22. A printer, comprising:

a print engine, having an input and being responsive to print image data, for printing an image;

a print image memory having an input and an output, for storing print image data;

a first data transfer bus coupling the output of the print image memory to the input of the print engine;

a mass memory having an input and an output, for storing print image data; and a second data transfer bus parallel to the first data transfer bus and coupling the output of the print image memory to the input of the mass memory, and the output of the mass storage to the input of the print image memory.

23. The printer of claim 4 wherein the print image data transferred by the data transfer means to the mass memory defines the same image represented by the print image data substantially simultaneously transferred in parallel to the print engine.

* * * * *